US012654629B2

(12) United States Patent
Deng et al.

(10) Patent No.: US 12,654,629 B2
(45) Date of Patent: Jun. 16, 2026

(54) VEHICLE-MOUNTED HOLDER

(71) Applicant: Shenzhen Xuancarbon Technology Co., Ltd., Shenzhen (CN)

(72) Inventors: Ming Deng, Shenzhen (CN); Tao Li, Shenzhen (CN)

(73) Assignee: Shenzhen Xuancarbon Technology Co., Ltd., Shenzhen (CN)

( * ) Notice: Subject to any disclaimer, the term of this patent is extended or adjusted under 35 U.S.C. 154(b) by 74 days.

(21) Appl. No.: 18/744,480

(22) Filed: Jun. 14, 2024

(65) Prior Publication Data

US 2025/0214513 A1       Jul. 3, 2025

(30) Foreign Application Priority Data

Dec. 29, 2023    (CN) ......................... 202323662309.0

(51) Int. Cl.
B60R 11/02          (2006.01)
B60R 11/00          (2006.01)
F16M 11/14          (2006.01)

(52) U.S. Cl.
CPC ...  B60R 11/0241 (2013.01); *B60R 2011/0052* (2013.01); *B60R 2011/0089* (2013.01); *F16M 11/14* (2013.01)

(58) Field of Classification Search
CPC .... F16M 11/14; F16M 13/02; B60R 11/0241; B60R 2011/0089; B60R 2011/0052
USPC ................ 224/556, 929; 248/288.31, 288.51
See application file for complete search history.

(56) References Cited

U.S. PATENT DOCUMENTS

| | | | | | |
|---|---|---|---|---|---|
| 1,455,441 | A | * | 5/1923 | La Hodny ................. | B60R 1/04 403/56 |
| 4,836,485 | A | * | 6/1989 | Cooper .............. | F16M 11/2021 248/278.1 |
| 4,842,174 | A | * | 6/1989 | Sheppard ............... | F16M 13/02 224/567 |
| 4,872,630 | A | * | 10/1989 | Cooper ................ | F16M 13/027 248/278.1 |
| 5,169,105 | A | * | 12/1992 | Yasukawa .............. | B60K 35/50 248/205.2 |
| 5,179,590 | A | * | 1/1993 | Wang .................. | B60R 11/0241 224/567 |
| 5,187,744 | A | * | 2/1993 | Richter ................ | F16M 11/041 379/426 |
| 5,485,793 | A | * | 1/1996 | Crowell ................. | A47B 23/04 108/44 |
| 5,673,628 | A | * | 10/1997 | Boos ....................... | B60N 3/001 108/138 |
| 5,690,307 | A | * | 11/1997 | Joyce .................... | F16M 11/40 248/205.2 |
| 5,751,548 | A | * | 5/1998 | Hall ................... | F16M 11/2064 361/679.41 |

(Continued)

*Primary Examiner* — Justin M Larson
(74) *Attorney, Agent, or Firm* — Westbridge IP LLC

(57)          ABSTRACT

Disclosed is a vehicle-mounted holder, applied to a vehicle. The vehicle-mounted holder includes: a first fixing member, an adjusting arm and a second fixing member. The first fixing member includes a positioning column inserted in the inserting hole. One end of the adjusting arm is connected to the first fixing member, and the adjusting arm is provided with an adjustable joint; and the second fixing member is configured to install user's mobile device and connected to a free end of the adjusting arm.

9 Claims, 6 Drawing Sheets

(56)　　　　　References Cited

U.S. PATENT DOCUMENTS

| | | | | |
|---|---|---|---|---|
| 5,845,885 | A * | 12/1998 | Carnevali | F16M 11/2078 |
| | | | | 248/484 |
| 5,941,488 | A * | 8/1999 | Rosen | F16M 11/28 |
| | | | | 248/278.1 |
| 6,158,793 | A * | 12/2000 | Castro | B60R 11/02 |
| | | | | 224/548 |
| 6,386,413 | B1 * | 5/2002 | Twyford | B60R 11/0252 |
| | | | | 108/138 |
| 6,412,426 | B1 * | 7/2002 | Holloway, Jr. | B60R 11/02 |
| | | | | 108/44 |
| 6,585,201 | B1 * | 7/2003 | Reed | F16M 13/02 |
| | | | | 248/917 |
| 7,320,450 | B2 * | 1/2008 | Carnevali | F16M 11/14 |
| | | | | 248/180.1 |
| 7,591,446 | B2 * | 9/2009 | Istas | F16M 11/14 |
| | | | | 403/77 |
| 7,753,330 | B2 * | 7/2010 | Brief | F16M 11/14 |
| | | | | 248/278.1 |
| 7,946,542 | B1 * | 5/2011 | Chapman | F16M 13/02 |
| | | | | 248/161 |
| 7,959,120 | B2 * | 6/2011 | Liao | B60R 11/0252 |
| | | | | 248/292.12 |
| 8,025,015 | B1 * | 9/2011 | Kennedy, Sr. | B60R 11/0252 |
| | | | | 248/562 |
| 8,261,954 | B2 * | 9/2012 | Lee | B60R 11/0258 |
| | | | | 224/558 |
| 8,366,064 | B2 * | 2/2013 | Chen | F16M 13/02 |
| | | | | 403/56 |
| 8,556,143 | B2 * | 10/2013 | Gold | B62J 11/00 |
| | | | | 224/413 |
| 8,608,120 | B2 * | 12/2013 | Chen | F16M 11/14 |
| | | | | 403/56 |
| 8,627,990 | B2 * | 1/2014 | Nakajima | B62J 11/00 |
| | | | | 224/555 |
| 9,527,456 | B2 * | 12/2016 | Ackeret | B60R 11/0241 |
| D814,383 | S * | 4/2018 | Mink | D12/223 |
| 9,933,109 | B2 * | 4/2018 | Moore | F16M 11/08 |
| 10,261,543 | B2 * | 4/2019 | Schachter | B60R 11/02 |
| 10,330,251 | B2 * | 6/2019 | Carnevali | F16M 13/022 |
| D873,812 | S * | 1/2020 | Peters | D14/452 |
| 10,583,790 | B2 * | 3/2020 | Wang | F16M 13/00 |
| 11,414,025 | B1 * | 8/2022 | Hamilton | B60R 11/0252 |
| D1,054,473 | S * | 12/2024 | Wang | D16/242 |
| 2011/0318093 | A1 * | 12/2011 | Liao | F16M 11/041 |
| | | | | 403/142 |
| 2021/0005368 | A1 * | 1/2021 | Breiwa | F16M 13/022 |
| 2023/0059408 | A1 * | 2/2023 | Parab | F16M 13/022 |
| 2025/0214513 | A1 * | 7/2025 | Deng | B60R 7/043 |

* cited by examiner

41

411

42

421

43

44

VEHICLE-MOUNTED HOLDER

CROSS-REFERENCE TO RELATED APPLICATIONS

The present application claims priority to Chinese Patent Application No. 202323662309.0, filed on Dec. 29, 2023, the entire contents of which are incorporated herein by reference.

TECHNICAL FIELD

The present application relates to the technical field of vehicle accessories, and in particular to a vehicle-mounted holder.

BACKGROUND

Nowadays, the navigation function in the mobile phone plays an indispensable role in the driver's driving process, so the vehicle-mounted mobile phone holder has emerged, which is a convenient tool for the driver to place and operate the mobile phone while driving. One end of the holder is usually connected to the car, and the other end of the holder is provided with a clamp for fixing the mobile phone.

However, existing vehicle-mounted holders are installed on and around the front windshield or dashboard of the car, which sometimes block the driver's view of the road conditions or the dashboard and indicator signals. The angle of view and the position of the mobile phone need to be adjusted, which is not convenient to use.

SUMMARY

The purpose of the present application is to provide a vehicle-mounted holder that is convenient for the user to operate.

In order to achieve the above purpose, the present application provides a vehicle-mounted holder, applied to a vehicle. The vehicle interior on both sides of a seat of the vehicle are provided with inserting holes, and the vehicle-mounted holder includes: a first fixing member, an adjusting arm and a second fixing member. The first fixing member includes a positioning column inserted in the inserting hole. One end of the adjusting arm is connected to the first fixing member, and the adjusting arm is provided with an adjustable joint; and the second fixing member is configured to install user's mobile device and connected to a free end of the adjusting arm.

In some embodiments of the present application, an assembly hole penetrating the first fixing member is provided along an axial direction of the positioning column, the positioning column is inserted into the inserting hole of the vehicle interior, and a main screw is configured to pass through the assembly hole and connect to the vehicle interior.

In some embodiments of the present application, the adjusting arm includes a first arm section, a second arm section and a third arm section hinged in sequence: one end of the first arm section away from the second arm section is connected to the first fixing member; and one end of the third arm section away from the second arm section is connected to the second fixing member.

In some embodiments of the present application, hinge notches are formed at both ends of the second arm section, and the first arm section and the third arm section are respectively hinged in the two hinge notches.

In some embodiments of the present application, the second arm section includes a first supporting arm and a second supporting arm, and both ends of an opposite side of the first supporting arm and the second supporting arm are concave: the first supporting arm and the second supporting arm are spliced to form the hinge notch; and one end of the first arm section close to the second arm section and one end of the third arm section close to the second arm section are configured as ball heads and assembled on a corresponding concave part of the second arm section.

In some embodiments of the present application, the adjusting arm further includes an adjusting assembly including a first screw joint; and the first supporting arm is provided with a first threaded hole between the two hinge notches, the second supporting arm is provided with a through hole aligned with the first threaded hole, and the first screw joint is configured to pass through the through hole and thread to the first threaded hole.

In some embodiments of the present application, the adjusting assembly further includes an adjusting knob provided with a second threaded hole, and the first screw joint is penetrated through the second threaded hole, the through hole and the first threaded hole in sequence.

In some embodiments of the present application, the first fixing member further includes a first ball sleeve, a supporting column is provided on a side surface of the positioning column, and the first ball sleeve is installed at a free end of the supporting column: one end of the first arm section away from the second arm section is configured as a ball head and is hinged in the first ball sleeve; and the second fixing member is provided with a second ball sleeve, and one end of the third arm section away from the second arm section is configured as a ball head and is hinged in the second ball sleeve.

In some embodiments of the present application, the vehicle-mounted holder further includes a second screw joint, a periphery of the supporting arm is provided with a pallet: one surface of the pallet away from the free end of the supporting arm is convex to form a conical surface, and a sidewall of the first ball sleeve is further provided with a third threaded hole; and the first ball sleeve is axially sleeved outside the pallet and encloses to form an installation space for the ball head, and the second screw joint is configured to pass through the third threaded hole and abut against the conical surface.

In some embodiments of the present application, the vehicle-mounted holder further includes an adjusting nut, an outer peripheral side of the second ball sleeve is provided with threads, and the adjusting nut is threadedly connected to an outside of the second ball sleeve, so as to adjust a matching tightness between the second ball sleeve and the ball head.

In the technical solution of the present application, the first fixing member of the vehicle-mounted holder is provided with the positioning column. The positioning column is installed in the inserting hole of the vehicle interior on both sides of the seat of the matching model. The specific installation location can be the inside of the door, or the underside of the armrest, so that mobile phones, tablet computers and other mobile devices installed on the vehicle-mounted holder can avoid the front windshield and instrument panel, making it convenient for users to observe the instrument panel and road conditions, and also to facilitate users to operate the center console of the vehicle. The user can adjust the angle of use through the adjusting arm, which further facilitates the use of the mobile device.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

Figure 1:
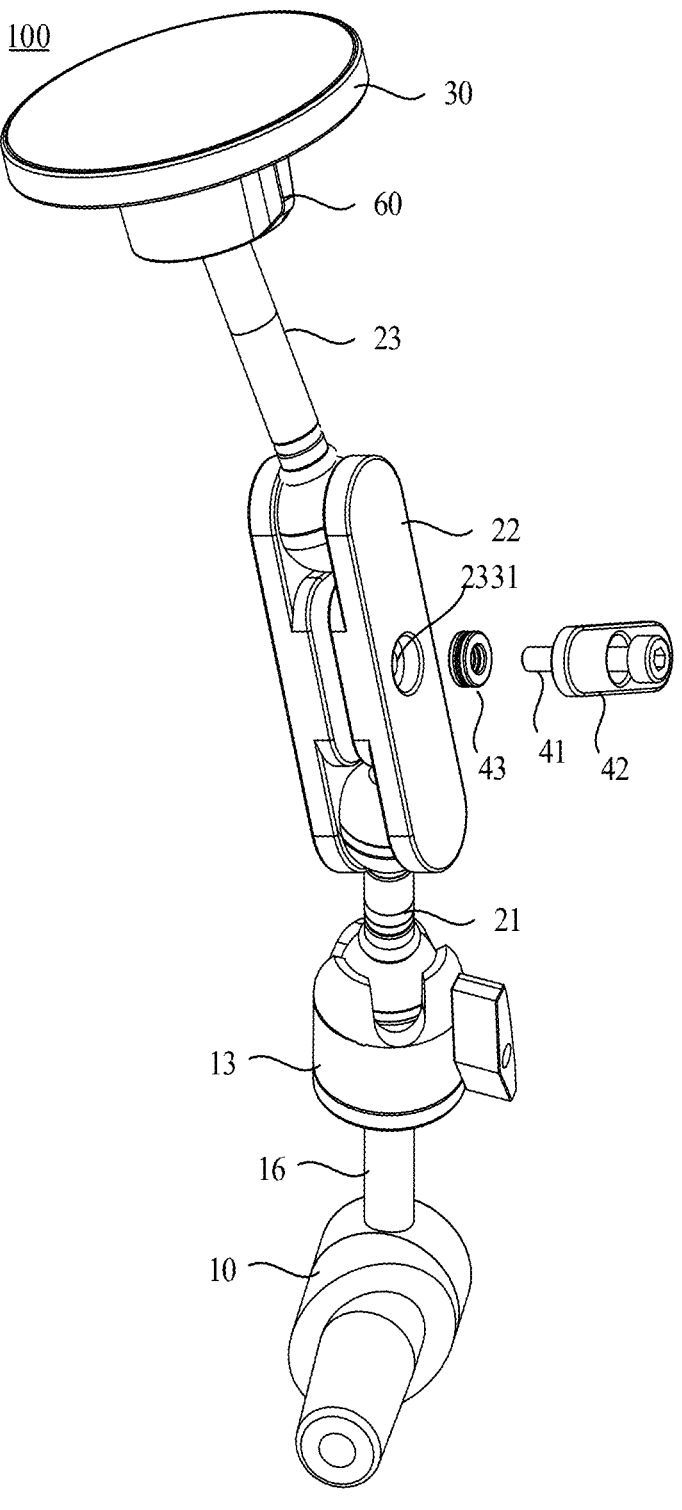
FIG. 1 is a schematic structural view of a vehicle-mounted holder according to an embodiment of the present application.
Figure 2:
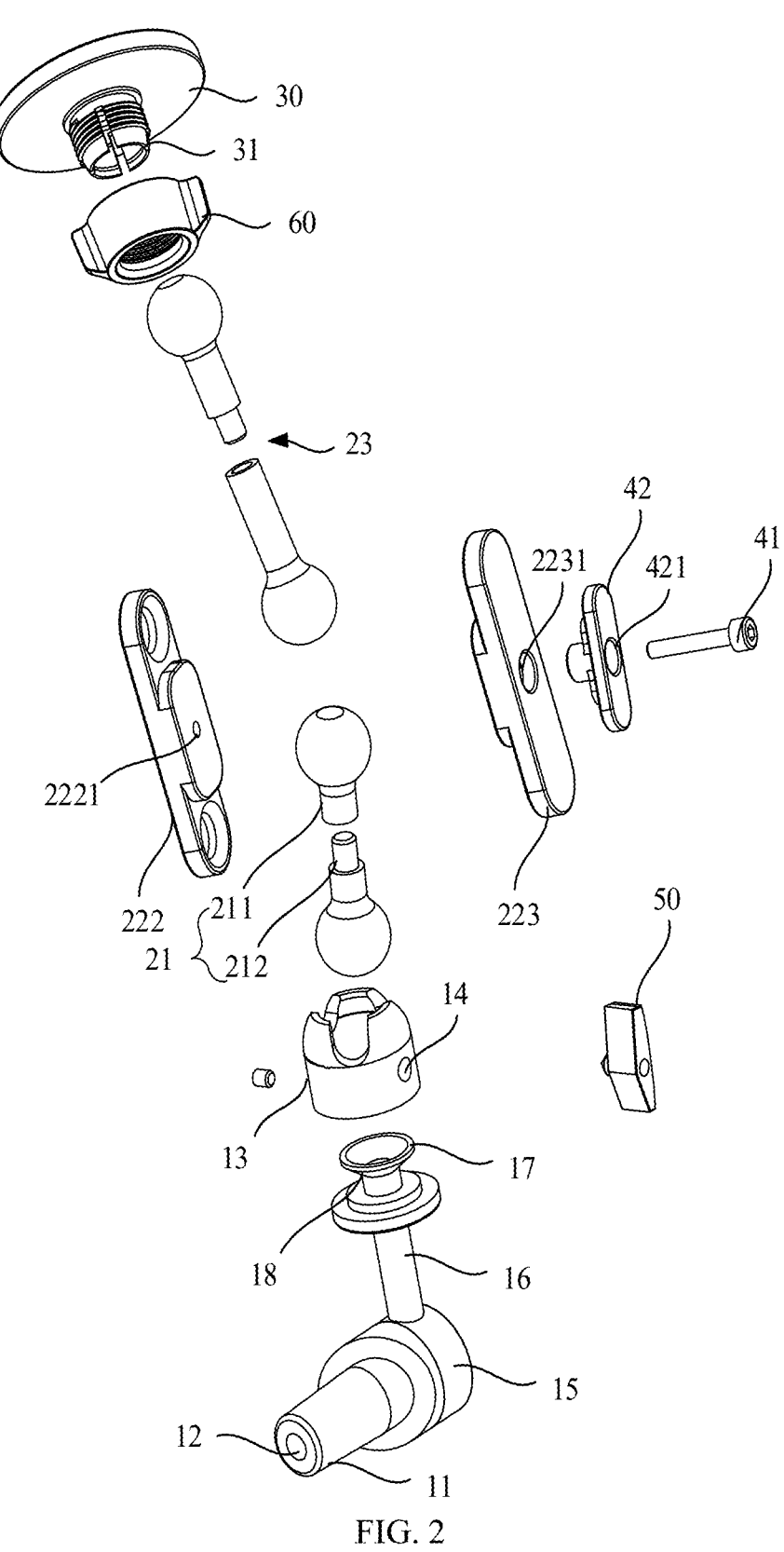
FIG. 2 is an exploded view of the vehicle-mounted holder according to an embodiment of the present application.
Figure 3:
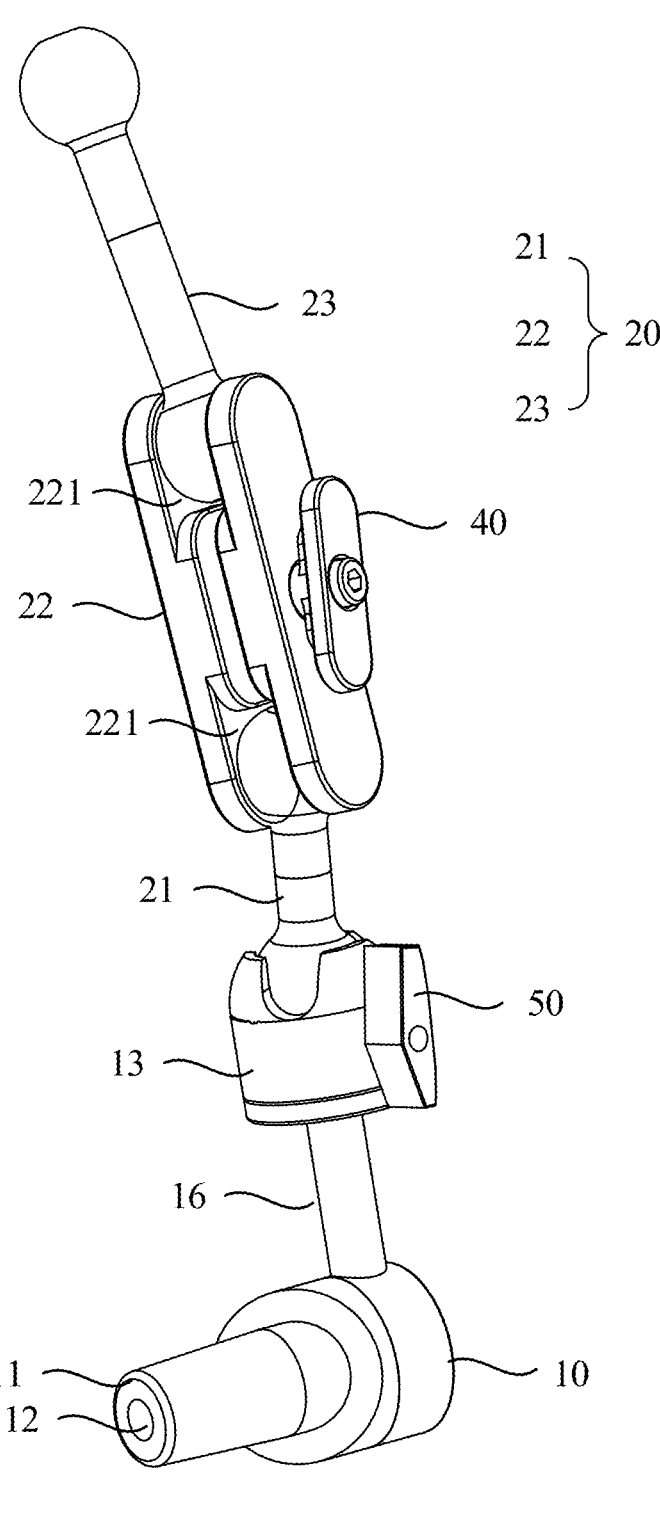
FIG. 3 is a schematic structural view of a vehicle-mounted holder according to an embodiment of the present application.
Figure 4:
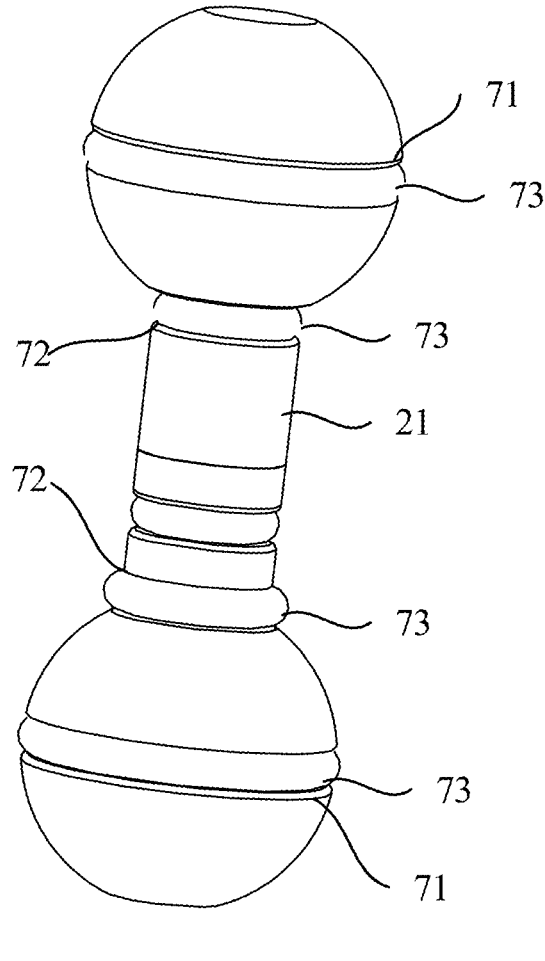
FIG. 4 is a schematic structural view of a first arm section according to an embodiment of the present application.
Figure 5:
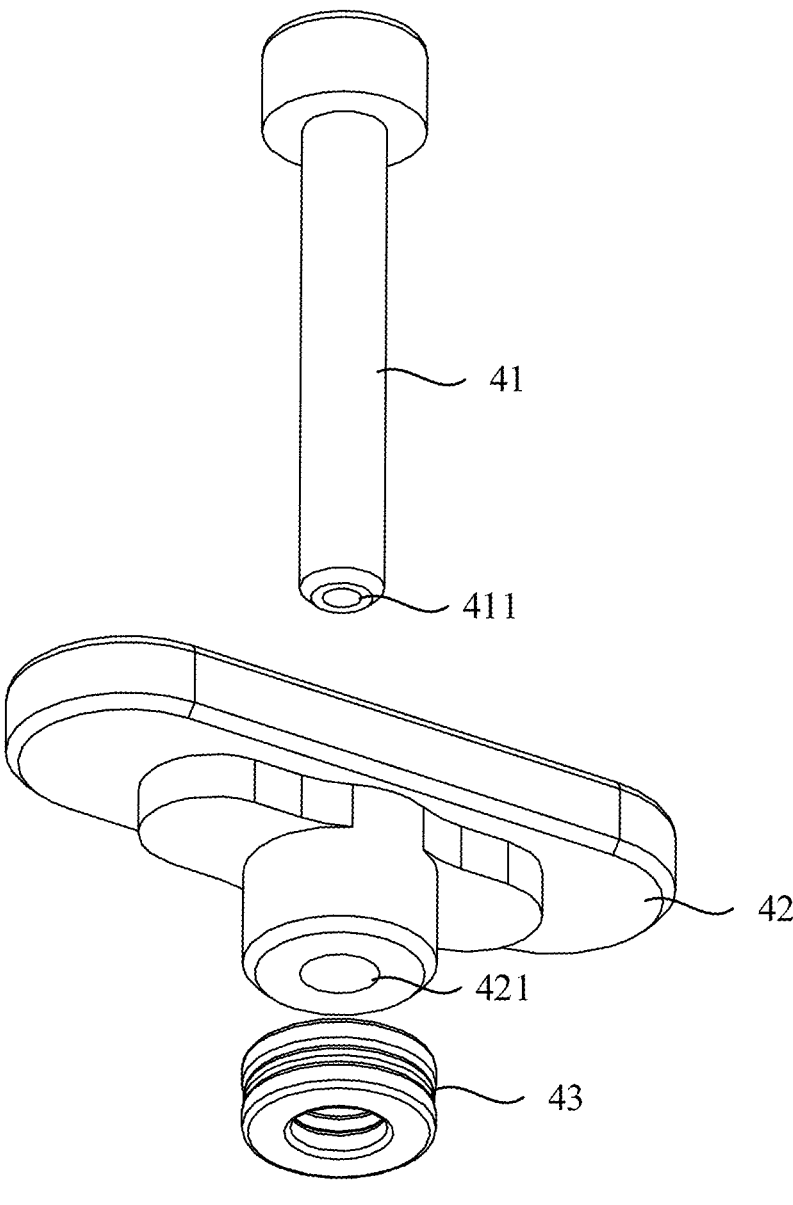
FIG. 5 is a schematic structural view of an adjusting assembly according to an embodiment of the present application.
Figure 5:
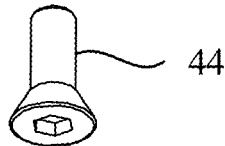
Figure 6:
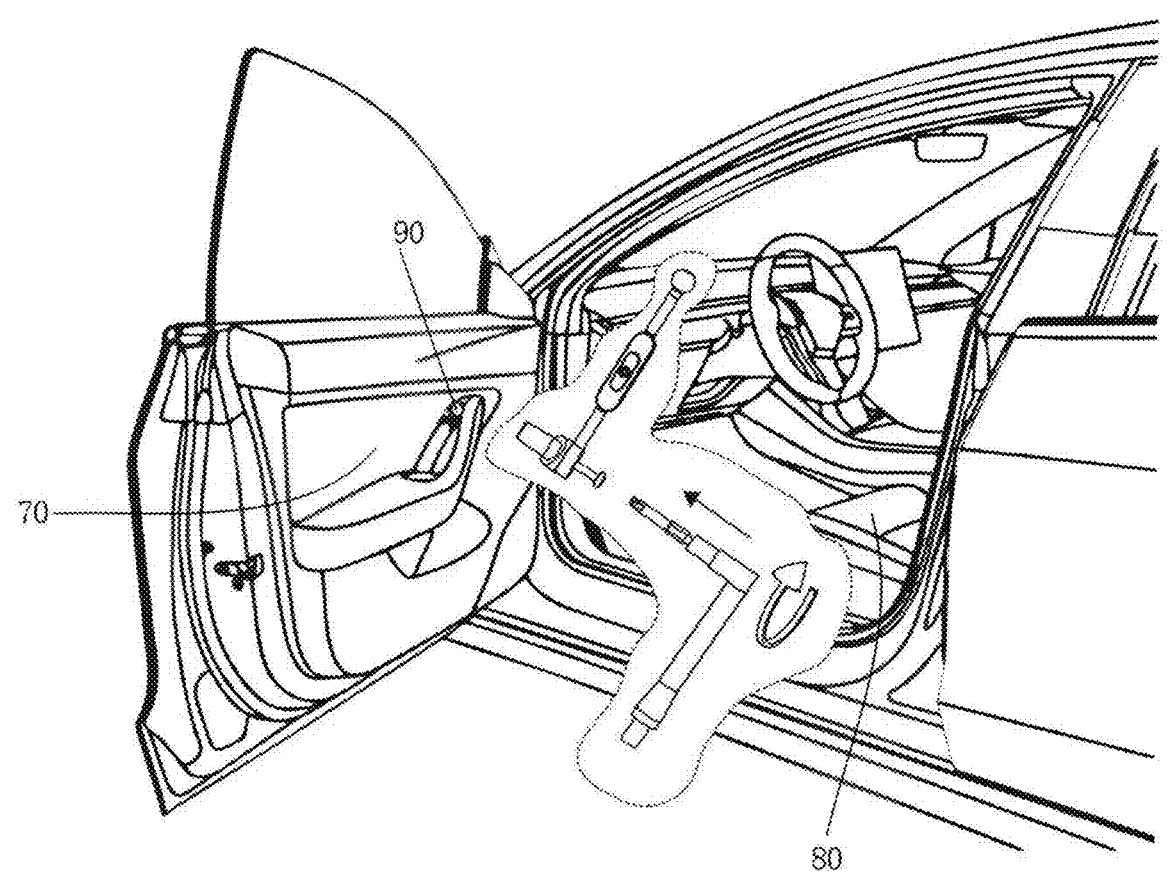
FIG. 6 is a schematic structural view of an in-vehicle assembly of a vehicle-mounted holder according to an embodiment of the present application.

Please refer to FIG. 1 to FIG. 6. The present application provides a vehicle-mounted holder 100, which is applied to vehicles. The vehicle here generally refers to small cars, trucks, vans and other cars. Of course, it can also be other electric vehicles with platform sills that are not recognized as motor vehicles. The vehicle interior 70 of the vehicle is provided with inserting holes 90 on both sides of the seat 80. Specifically, it can be provided inside of the door or under the armrest next to the seat 80. The vehicle-mounted holder 100 includes a first fixing member 10, an adjusting arm 20 and a second fixing member 30. The first fixing member 10 includes a positioning column 11 inserted in the inserting hole 90. One end of the adjusting arm 20 is connected to the first fixing member 10, and the adjusting arm 20 is provided with an adjustable joint. The second fixing member 30 is configured to install the user's mobile device, and the second fixing member 30 is connected to the free end of the adjusting arm 20.

The first fixing member 10, the adjusting arm 20 and the second fixing member 30 may be made of metal. For example, steel alloy, aluminum alloy, etc., and may also be made of plastic, or may be a combination of structural parts of different materials. The positioning column 11 may be in an interference fit with the inserting hole 90 and can also be connected with threads, which is not limited here. The second fixing member 30 is configured to fix the user's mobile device in various ways. For example, the second fixing member 30 includes a backboard, a bottom holder and two clamping arms. The user can place the mobile phone on the bottom holder and lean the mobile phone against the backboard. The clamping arm clamps the mobile phone to stabilize the mobile phone, and there are many specific implementation methods of the second fixing member 30, which are not listed here.

The adjustable joint of the adjusting arm 20 can be adjusted in a telescopic manner. For example, the adjusting arm 20 includes a sleeve and a telescopic rod. One end of the sleeve is connected to the first fixing member 10. One end of the telescopic rod is damped and slidably installed in the sleeve, and the other end of the telescopic rod is connected to the second fixing member 30. The adjustable joint can also be adjusted by rotation. For example, the adjusting arm 20) includes two hinged arms with two phases, and a plurality of adjustable joints can be provided. The specific implementation methods of the adjusting arm 20 are various, which are not listed here.

In the technical solution of the present application, the first fixing member 10 of the vehicle-mounted holder 100 is provided with a positioning column 11. The positioning column 11 is installed in the inserting holes 90 of the vehicle interior 70 on both sides of the seats 80 of the matching model. The specific installation location can be the inside of the door, or the underside of the armrest, so that mobile phones, tablet computers and other mobile devices installed on the vehicle-mounted holder 100 can avoid the front windshield and instrument panel, making it convenient for users to observe the instrument panel and road conditions, and also to facilitate users to operate the center console of the vehicle. The user can adjust the angle of use through the adjusting arm 20, which further facilitates the use of the mobile device.

In an embodiment, the positioning column 11 is provided with an assembly hole 12 penetrating the first fixing member 10 along the axial direction of the positioning column 11, and the positioning column 11 is inserted into the inserting hole 90 of the automatic interior. The main screw joint passes through the assembly hole 12 and is connected to the vehicle interior 70. In this way, the positioning column 11 is stably installed and can ensure the overall stability of the vehicle-mounted holder 100.

In an embodiment of the present application, the adjusting arm 20 includes a first arm section 21, a second arm section 22 and a third arm section 23 that are hinged in sequence. One end of the first arm section 21 away from the second arm section 22 is connected to the first fixing member 10, and the end of the third arm section 23 away from the second arm section 22 is connected to the second fixing member 30.

Through the above solution, the adjusting arm 20 can modulate the relative position between the second fixing member 30 and the first fixing member 10 through the hinged structure between the first arm section 21 and the second arm section 22 and the hinged structure between the third arm section 23 and the second arm section 22. The second fixing member 30 has a wider adjustable range and can better meet the needs of users.

The hinged structure between the first arm section 21 and the second arm section 22 and the hinged structure between the third arm section 23 and the second arm section 22 can be the same structure or different structures. There are many specific implementation methods, which can be the link hinge or a ball hinge. In an embodiment of the present application, hinge notches 221 are formed on both ends of the second arm section 22, and the first arm section 21 and the third arm section 23 are respectively hinged in the hinge notches 221. The range of movement of the first arm section 21 and the third arm section 23 is limited by the opening size of the hinge notch 221. The larger the opening of hinge notch 221 is, the greater the range of movement of the first arm section 21 and the third arm section 23 is. The smaller the opening of hinge notch 221 is, the more stable the connection between the first arm section 21 and the second arm section 22 and the third arm section 23 and the second arm section 22 are.

The specific implementation ways of the second arm section 22 are various. In an embodiment of the present application, two pairs of sidewalls of the hinge notch 221 of the second arm section 22 are provided with through holes 2231, and one end of the first arm section 21 is provided with a rotation hole. The pin shaft passes through a through hole 2231, a rotating hole and another through hole 2231 in sequence.

In an embodiment of the present application, the second arm section 22 includes a first supporting arm 222 and a second supporting arm 223. Both ends of the opposite side of the first supporting arm 222 and the second supporting arm 223 are concavely provided. The first supporting arm 222 and the second supporting arm 223 are spliced to form the hinge notch 221. One end of the first arm section 21 close to the second arm section 22 and one end of the third arm section 23 close to the second arm section 22 are configured as ball heads and assembled on the corresponding concave part of the second arm section 22. In this way, when installing the second arm section 22, the ball head of the first arm section 21 and the ball head of the third arm section 23 can be placed in the concave part of the first supporting arm 222 in advance, and the second supporting arm 223 is spliced with the first supporting arm 222. The first arm section 21 and the second arm section 22 are clamped, which is easy to install.

There are many ways to splice the first supporting arm 222 and the second supporting arm 223. In an embodiment of the present application, one side of the first supporting arm 222 is rotationally connected to one side of the second supporting arm 223 through a hinge, and the other side of the first supporting arm 222 is fastened to the other side of the second supporting arm 223 through a bolt. In this way, the first supporting arm 222 and the second supporting arm 223 are folded together to further facilitate installation. The first supporting arm 222 and the second supporting arm 223 are also integrated to avoid the problem of too many parts that are easily lost after disassembly.

In an embodiment of the present application, the adjusting arm 20 further includes an adjusting assembly 40, and the adjusting assembly 40 includes a first screw joint 41. The first supporting arm 222 is provided with a first threaded hole 2221 at a position between the two hinge notches 221, and the second supporting arm 223 is provided with a through hole 2231 aligned with the first threaded hole 2221. The first screw joint 41 passes through the through hole 2231 and is threadedly connected to the first threaded hole 2221. In this way, the user can adjust the clamping force of the first supporting arm 222 and the second supporting arm 223 on the ball head by adjusting the tightness of the first screw joint 41, so that the user can tighten the first screw joint 41 to fix the shape of the adjusting arm 20 after the adjusting arm 20 is adjusted to the desired shape, which provides higher flexibility.

Further, in order to facilitate the user to manually screw without using tools, in an embodiment of the present application, the adjusting assembly 40 also includes an adjusting knob 42. The adjusting knob 42 is provided with a second threaded hole 421, and the first screw joint 41 passes through the second threaded hole 421, the through hole 2231 and the first threaded hole 2221 in sequence. In this way, the user can loosen directly by rotating the adjusting knob 42, and the first screw joint 41 can also be as a limiter to limit the separation of the first supporting arm 222, the second supporting arm 223 and the adjusting knob 42, thereby preventing the user from losing parts during the adjustment process.

In order to further facilitate the user to rotate the knob, in an embodiment of the present application, the adjusting assembly 40 also includes a plane bearing 43. The plane bearing 43 is sleeved on the first screw joint 41 and is located between the adjusting knob 42 and the second supporting arm 223, which can avoid the problem that after the user tightens the adjusting knob 42, the pressure between the adjusting knob 42 and the second supporting arm 223 is too large, and the user needs to overcome a large friction force to rotate the adjusting knob 42, which is convenient for the user.

Further, in an embodiment of the present application, the adjusting assembly 40 also includes an anti-loosening screw 44. The end surface of the first screw joint 41 away from the head is provided with an anti-loosening screw hole 411. The anti-loosening screw 44 is installed in the anti-loosening screw hole 411, the head of the anti-loosening screw 44 is limited to the side of the first supporting arm 222 away from the second supporting arm 223. This can prevent the first screw joint 41 from rotating during the rotation of the adjusting knob 42 and prevent the first screw joint 41 from falling off.

In an embodiment of the present application, the first fixing member 10 also includes a first ball sleeve 13, and a supporting column is provided on the side surface of the positioning column 11. The first ball sleeve 13 is installed at the free end of the supporting column. The end of the first arm section 21 away from the second arm section 22 is configured as a ball head, and is hinged in the first ball sleeve 13. The second fixing member 30 is provided with a second ball sleeve 31, and the end of the third arm section 23 away from the second arm section 22 is configured as a ball head and is hinged in the second ball sleeve 31.

Through the above solution, the vehicle-mounted holder 100 can adjust the overall orientation of the adjusting arm 20 and the second fixing member 30 by rotating the first arm section 21, and adjust the orientation of the mobile device assembled on the second fixing member 30 towards users by rotating the second fixing member 30.

The first ball sleeve 13 and the second ball sleeve 31 can be damping hinged with the corresponding ball head, that is, the ball head is in the interference fit with the ball sleeve, and there is a certain friction force between the two when they rotate relative to each other. In an embodiment of the present application, the vehicle-mounted holder 100 further includes a second screw joint 50, and the periphery of the supporting arm 16 is provided with a pallet 17. One surface of the pallet 17 away from the free end of the supporting arm 16 is convex to form a conical surface 18, and the sidewall of the first ball sleeve 13 is also provided with a third threaded hole 14. The first ball sleeve 13 is axially sleeved outside the pallet 17 and encloses to form the installation space for the ball head. The second screw joint 50 passes through the third threaded hole 14 and abuts against the conical surface 18. In this way, the second screw joint 50 can be tightened to push it against the conical surface 18, so that the pallet 17 presses the ball head into the ball sleeve, or the second screw joint 50 can be loosened to loosen the ball head, the first ball sleeve 13 and the pallet 17, making it easy to adjust the shape of the holder.

In an embodiment of the present application, the vehicle-mounted holder 100 further includes an adjusting nut 60, and the outer peripheral side of the second ball sleeve 31 is provided with threads. The adjusting nut 60 is threadedly connected to the outside of the second ball sleeve 31 to adjust the matching tightness of the second ball sleeve 31 and the ball head. The second ball sleeve 31 is generally made of plastic material, and is generally provided with notches to facilitate deformation. In this way, when the third screw joint is tightened, the second ball sleeve 31 tightens and clamps the ball head, so that the second fixing member 30 is fastened to the third arm section 23. Considering that the second fixing member 30 is generally provided with a flat plate structure to support the mobile device, the adjusting nut 60 is configured to avoid the flat plate structure when screwing, making it convenient for the user to rotate the knob.

In an embodiment of the present application, the outer wall of the ball head of the first arm section 21 and the outer wall of the ball head of the third arm section 23 are provided with a first annular groove 71, and the neck of the ball head of the first arm section 21 and the outer wall of the ball head of the third arm section 23 are provided with a first annular groove 71. Both the first annular groove 71 and the second annular groove 72 are provided with a rubber ring 73. In this way, the rubber ring 73 is in a flexible contact with the wall surface of the ball sleeve, which can alleviate the vibration transmitted by the car body on the one hand, and can avoid the wear caused by the mutual movement of the two rigid materials of the ball head and the ball sleeve on the other hand, thereby increasing the service life of the product.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A vehicle-mounted holder, applied to a vehicle, wherein the vehicle comprises at least one inserting hole on each side of a seat in a vehicle interior, the vehicle-mounted holder comprises:

a first fixing member comprising a positioning column inserted in one inserting hole;

an adjusting arm, wherein one end of the adjusting arm is connected to the first fixing member, and the adjusting arm is provided with an adjustable joint; and a second fixing member configured to install user's mobile device and connected to a free end of the adjusting arm;

wherein an assembly hole penetrating the first fixing member is provided along an axial direction of the positioning column, the positioning column is inserted into the inserting hole of the vehicle interior, and a main screw is configured to pass through the assembly hole and connect to the vehicle interior.

2. The vehicle-mounted holder according to claim 1, wherein the adjusting arm comprises a first arm section, a second arm section and a third arm section hinged in sequence;

one end of the first arm section away from the second arm section is connected to the first fixing member; and one end of the third arm section away from the second arm section is connected to the second fixing member.

3. The vehicle-mounted holder according to claim 2, wherein hinge notches are formed at both ends of the second arm section, and the first arm section and the third arm section are respectively hinged in the two hinge notches.

4. The vehicle-mounted holder according to claim 3, wherein the second arm section comprises a first supporting arm and a second supporting arm, and both ends of an opposite side of the first supporting arm and the second supporting arm are concave;

the first supporting arm and the second supporting arm are spliced to form the hinge notch; and one end of the first arm section close to the second arm section and one end of the third arm section close to the second arm section are configured as ball heads and assembled on a corresponding concave part of the second arm section.

5. The vehicle-mounted holder according to claim 4, wherein the adjusting arm further comprises an adjusting assembly comprising a first screw joint; and the first supporting arm is provided with a first threaded hole between the two hinge notches, the second supporting arm is provided with a through hole aligned with the first threaded hole, and the first screw joint is configured to pass through the through hole and thread to the first threaded hole.

6. The vehicle-mounted holder according to claim 5, wherein the adjusting assembly further comprises an adjusting knob provided with a second threaded hole, and the first screw joint is penetrated through the second threaded hole, the through hole and the first threaded hole in sequence.

7. The vehicle-mounted holder according to claim 2, wherein the first fixing member further comprises a first ball sleeve, a supporting column is provided on a side surface of the positioning column, and the first ball sleeve is installed at a free end of the supporting column;

one end of the first arm section away from the second arm section is configured as a ball head and is hinged in the first ball sleeve; and the second fixing member is provided with a second ball sleeve, and one end of the third arm section away from the second arm section is configured as a ball head and is hinged in the second ball sleeve.

8. The vehicle-mounted holder according to claim 7, further comprising a second screw joint, wherein a periphery of the supporting column is provided with a pallet;

one surface of the pallet away from the free end of the supporting column is convex to form a conical surface, and a sidewall of the first ball sleeve is further provided with a third threaded hole; and the first ball sleeve is axially sleeved outside the pallet and encloses to form an installation space for the ball head, and the second screw joint is configured to pass through the third threaded hole and abut against the conical surface.

9. The vehicle-mounted holder according to claim 7, further comprising an adjusting nut, wherein an outer peripheral side of the second ball sleeve is provided with threads, and the adjusting nut is threadedly connected to an outside of the second ball sleeve, so as to adjust a matching tightness between the second ball sleeve and the ball head.

* * * * *